US011016773B2

(12) United States Patent
Sultana et al.

(10) Patent No.: US 11,016,773 B2
(45) Date of Patent: May 25, 2021

(54) PROCESSOR TRACE EXTENSIONS TO FACILITATE REAL-TIME SECURITY MONITORING

(71) Applicant: Intel Corporation, Santa Clara, CA (US)

(72) Inventors: Salmin Sultana, Hillsboro, OR (US); Beeman Strong, Portland, OR (US); Ravi Sahita, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 10 days.

(21) Appl. No.: 16/585,287

(22) Filed: Sep. 27, 2019

(65) Prior Publication Data
US 2020/0026519 A1 Jan. 23, 2020

(51) Int. Cl.
G06F 9/38 (2018.01)
G06F 9/445 (2018.01)
G06F 11/34 (2006.01)
G06F 9/48 (2006.01)
G06F 9/30 (2018.01)

(52) U.S. Cl.
CPC ........ *G06F 9/3836* (2013.01); *G06F 9/30058* (2013.01); *G06F 9/3871* (2013.01); *G06F 9/44505* (2013.01); *G06F 9/4806* (2013.01); *G06F 11/3466* (2013.01)

(58) Field of Classification Search
None
See application file for complete search history.

(56) References Cited

U.S. PATENT DOCUMENTS

| 6,633,970 | B1* | 10/2003 | Clift | G06F 9/384 |
| | | | | 712/217 |
| 8,561,033 | B2* | 10/2013 | Aranguren | G06F 11/3648 |
| | | | | 717/128 |
| 10,007,784 | B2 | 6/2018 | Le May et al. | |
| 10,248,424 | B2 | 4/2019 | Sultana et al. | |
| 2003/0192034 | A1* | 10/2003 | Hayase | G06F 11/3636 |
| | | | | 717/128 |
| 2005/0183062 | A1* | 8/2005 | Ubukata | G06F 9/4486 |
| | | | | 717/104 |
| 2013/0185601 | A1* | 7/2013 | Mayer | G06F 11/3636 |
| | | | | 714/45 |

(Continued)

FOREIGN PATENT DOCUMENTS

WO 2013101251 A1 7/2013

OTHER PUBLICATIONS

Ge et al., "Griffin: Guarding Control Flows Using Intel Processor Trace", ASPLOS Apr. 8-12, 2017, 14 pages.

(Continued)

*Primary Examiner* — Eric Coleman
(74) *Attorney, Agent, or Firm* — Jaffery Watson Mendonsa & Hamilton LLP

(57) ABSTRACT

Embodiments described herein provide for a computing device comprising a hardware processor including a processor trace module to generate trace data indicative of an order of instructions executed by the processor, wherein the processor trace module is configurable to selectively output a processor trace packet associated with execution of a selected non-deterministic control flow transfer instruction.

19 Claims, 8 Drawing Sheets

(56) References Cited

U.S. PATENT DOCUMENTS

2014/0068346 A1* 3/2014 Scott ................... G06F 11/3636
                                                                714/45
2017/0052869 A1* 2/2017 Gordon ............... G06F 11/0721
2017/0220447 A1* 8/2017 Brandt ................. G06F 9/4812
2018/0225446 A1* 8/2018 Liu ....................... G06F 21/577

OTHER PUBLICATIONS

Intel 64 and IA-32 Architectures Software Developer's Manual, Chapter 35 Inter Processor Trace, May 2019, 86 pages.

* cited by examiner

PROCESSOR TRACE EXTENSIONS TO FACILITATE REAL-TIME SECURITY MONITORING

BACKGROUND

Microprocessors can be configured with debug functionality that enables real time processor instruction tracing. Processor tracing is a debug feature that enables the logging of instructions executed by a processor. Trace data output by a processor can be used to explain what instructions were executed by a processor by generating data packets with information about control flow, timing, and other contextual information related to instruction execution. While processor tracing techniques were generally designed for program and processor debugging, techniques have been developed to leverage processor trace data to enable deterministic control-flow integrity solutions to detect control flow attacks or more complex forms of malware attacks. Accordingly, the present state of the art may benefit from systems and methods that enhance the efficiency of processor tracing for use in detecting malware and enhancing control flow integrity.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings, and in which.

DETAILED DESCRIPTION

Figure 1:
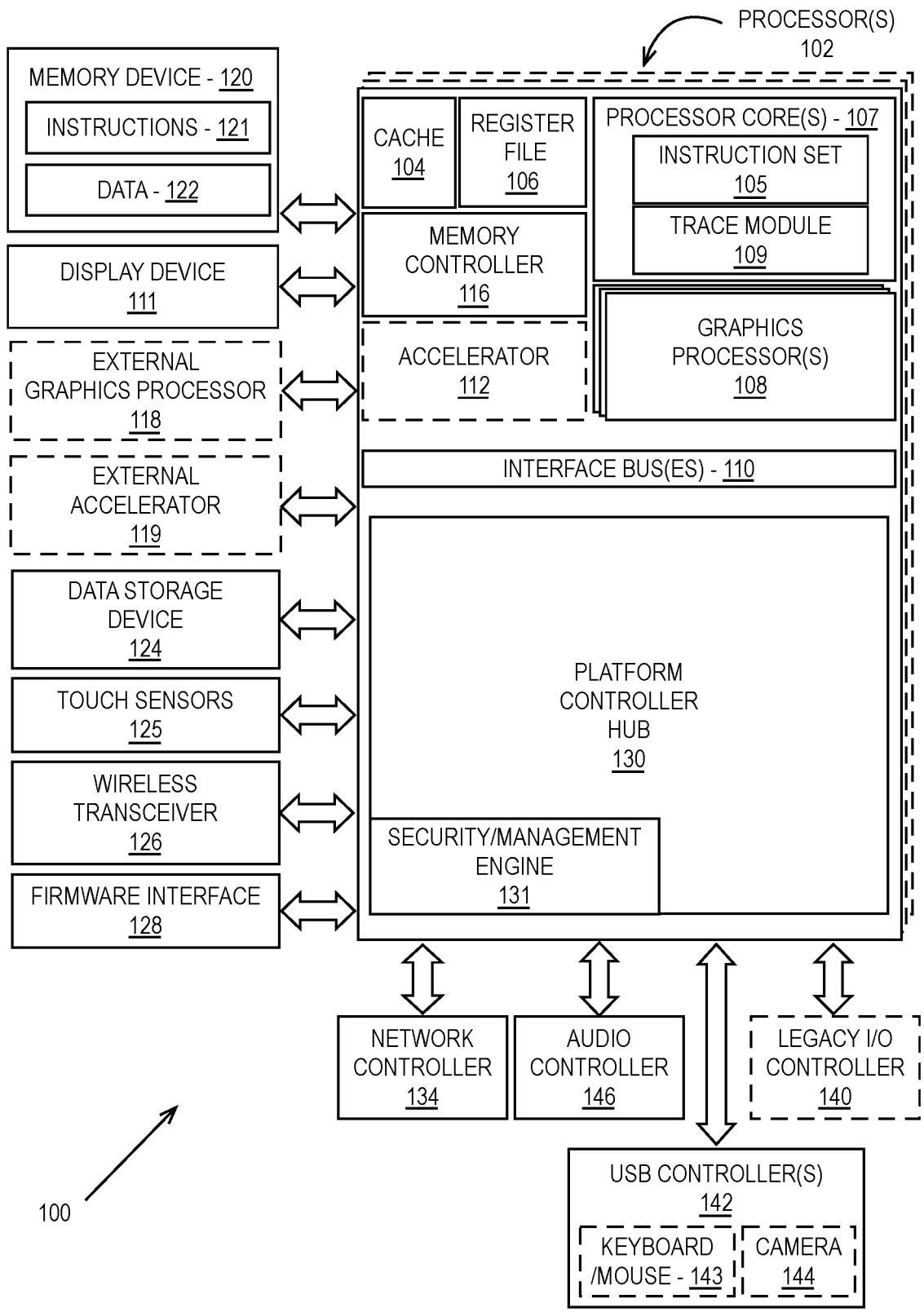
FIG. 1 illustrates a computing system that includes processor trace capability that can be used to enable control flow exploit detection and mitigation.

Processors described herein include instruction trace circuitry that can be configured to capture information related to execution of a target application, a plurality of applications, selected memory ranges and/or an entire system. The instruction trace circuitry can enable real-time instruction tracing (RTIT), in which timing information, program flow information (e.g., branch targets, branch taken/not taken indicators, function return addresses) is output in the form of data packets. The data packets of the processor trace data may be utilized for control flow analysis operations, e.g., to reconstruct the program flow. The reconstructed program flow data can be used to maintain control flow integrity during execution of programs on the processor. For example, machine learning solutions can be implemented to use processor trace data to defend against control flow attacks and/or other more complex attacks, such as fileless (e.g., memory-only) malware and/or data-oriented-programming (DOP) attacks.

For security use cases, real-time data processing with low overhead is desirable, particularly for large-scale security solutions. Collecting a large volume of processor trace data without the ability to filter out data that is unnecessary for security analysis can present a performance bottle neck for real-time security analysis. Additionally, existing processor trace functionality does not provide the information needed to develop higher-performance and more advanced machine learning security solutions that can be used, for example, to defend against script-based malware.

Described herein are processor trace hardware extensions that facilitate the development of real-time, low overhead, and efficient security solutions able to defend against advanced security attacks. One embodiment provides a hardware extension that enables the specification of specific types of trace packets to capture. One embodiment provides a hardware extension that enables packets to specify a branch type and operand type. One embodiment provides a hardware extension that enables the output of processor trace packets for indirect branches that include source instruction pointer data along with the output of trace packets that include target instruction pointer data. Specific implementation techniques for the various embodiments described herein can vary, as will be noted below.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, an overview of exemplary data processing system and processor logic is provided, along with details for the various embodiments presented herein. The following embodiments are described with reference to a CPU. However, similar techniques and teachings can be applied to other types of circuits or semiconductor devices, including but not limited to a many integrated core (MIC) processor, a graphics processor, or one or more instances of a field programmable gate array (FPGA).

System Overview

FIG. 1 illustrates a computing system 100 that includes processor trace capability that can be used to enable control flow exploit detection and mitigation. The system 100 may be used in a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 100 can include, couple with, or be integrated within: a server-based gaming platform; a game console, including a game and media console; a mobile gaming console, a handheld game console, or an online game console. In some embodiments the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 105. In some embodiments, instruction set 105 may facilitate Complex Instruction Set Computing (CISC), Reduced Instruction Set Computing (RISC), or computing via a Very Long Instruction Word (VLIW). One or more processor cores 107 may process a different instruction set 105, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102. In one embodiment the register file 106 can include control registers that can be used to configure specific functionality of the processor 102.

In some embodiments, one or more instances of the processor 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor 102 (or processors) include an integrated memory controller 116 and a platform controller hub 130. The memory controller 116 facilitates communication between a memory device and other components of the system 100, while the platform controller hub (PCH) 130 provides connections to I/O devices via a local I/O bus. The PCH 130 can include a security/management engine 131, which can enable out-of-band management functionality for the system 100. The security/management engine 131, in one embodiment, is a converged security and management engine (CSME), which can be configured to enable a trusted execution environment that provides secure communications and secure operations for the system 100.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the system 100, to store data 122 and instructions 121 for use when the processors 102 executes an application or process. The memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In some embodiments a display device 111 can connect to the processors 102. The display device 111 can be one or more of an internal display device, as in a mobile electronic device or a laptop device or an external display device attached via a display interface (e.g., DisplayPort, etc.). In one embodiment the display device 111 can be a head mounted display (HIVID) such as a stereoscopic display device for use in virtual reality (VR) applications or augmented reality (AR) applications.

In some embodiments the platform controller hub 130 enables peripherals to connect to the memory device 120 and the processors 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network via, for example, Ethernet and Omni-Path. In some embodiments, a high-performance network controller (not shown) couples with the interface bus 110. The wireless transceiver 126 and network controllers 134 can enable communication via communication protocols including but not limited to TCP, UDP, iWARP, RDMA, and other similar communication protocols. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the processors 102. For example, the system 100 can include external instances of the memory controller 116 and/or platform controller hub 130, which may be configured as a memory controller hub and peripheral controller hub within a system chipset that is in communication with the processors 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In one embodiment the processors 102 include a trace module 109 that enables hardware real-time instruction tracing (RTIT) support. Operations performed by the trace module 109 can be configured via one or more system control registers within the register file 106. The trace module 109 can be configured to automatically output trace data indicative of the control flow of executing software. The trace data that is output by the processor 102 may be used by an exploit detector, which can periodically analyze trace data to identify exploits. For example, the exploit detector may apply one or more heuristic checks to the processor trace data to identify suspicious behavior. The exploit detector may also maintain a shadow stack based on the trace data that may be used to identify suspicious behavior. Such techniques enable the system 100 to provide efficient monitoring for control flow exploits including return-oriented programming and jump-oriented programming exploits, as well as data-oriented programming (DOP) attacks without modifying client software. To enhance the functionality of the exploit and attack monitoring techniques, the trace module can be used to enable or disable (e.g., filter) the output or recording of specific types of trace packets and to output additional trace information, such as source instruction pointer data.

In one embodiment, the trace module 109 may be embodied as any hardware, microcode, firmware, or other components of the processor 102 capable of generating trace data that may be used to reconstruct the control flow executed by the processor 102. The trace module 109 may log data packets relating to whether conditional branches are taken or not taken (TNT), target addresses of indirect branch instructions (TIP), flow update (FUP), and MODE packets. TNT packets track the direction of conditional branches within basic blocks. TIP packets record the target address of indirect branches, exceptions, interrupts, and far branches. A TNT packet can reference multiple conditional branches, where each bit in the packet corresponds to a conditional branch. If a conditional branch is taken during execution, a bit of value 1 is recorded; 0 otherwise. FUP packets can be used to capture the source addresses for asynchronous events (interrupt and exceptions), as well as other cases where the source address cannot be determined from the binary. Mode packets record important processor execution information, such as execution mode (16/32/64 bit), for proper trace decoding.

Processor Trace Filtering

Figure 2:
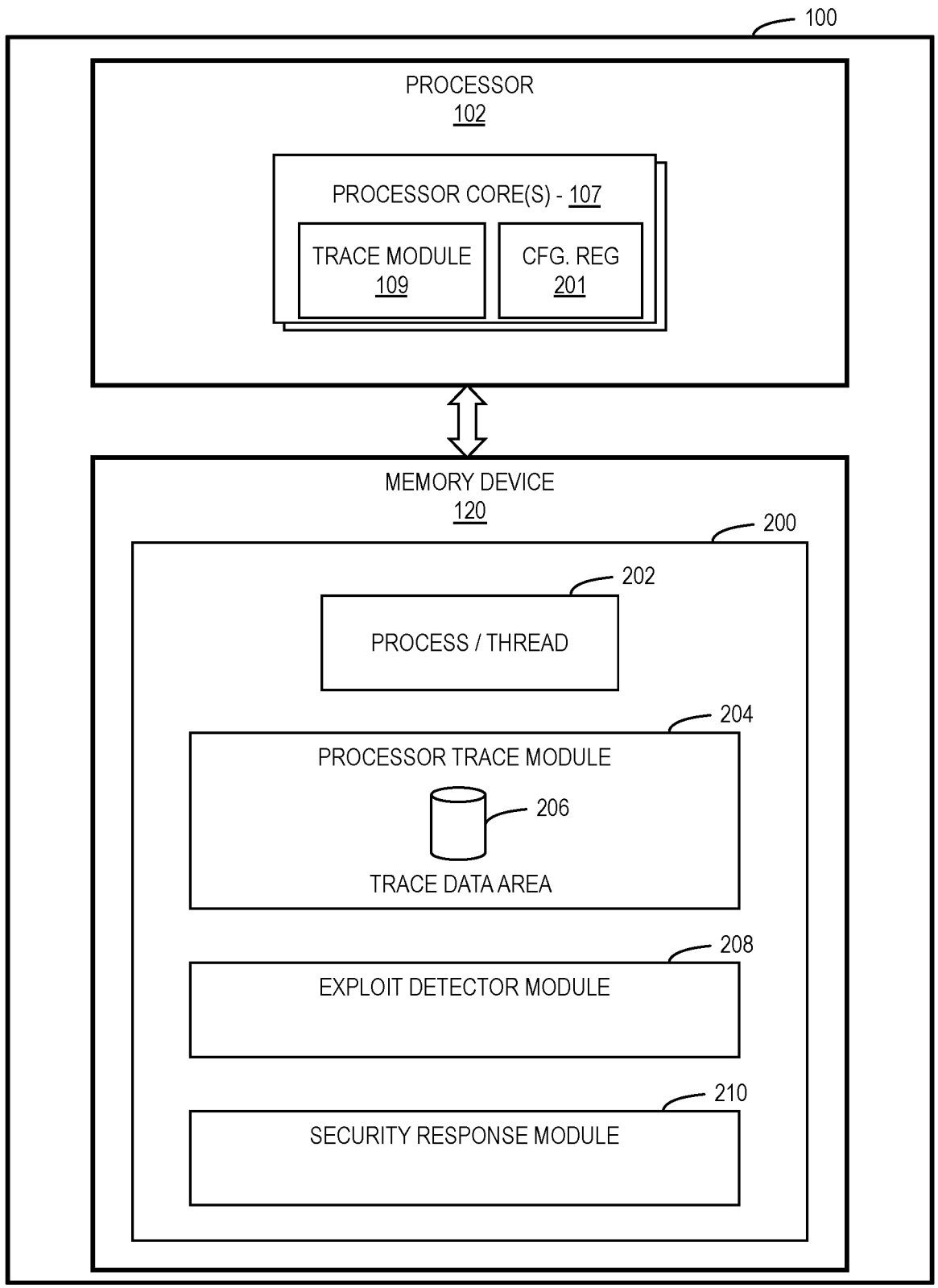
FIG. 2 illustrates a computing environment that can be executed on the computing device.

FIG. 2 illustrates a computing environment 200 that can be executed on the computing system 100. A processor 102 of the computing system can include one or more processor cores 107 that include a trace module 109 and a set of configuration registers 201. The configuration registers 201 can be used to enable, disable, and configure processor tracing operations performed by the trace module 109. The configuration registers 201 can include but are not limited to model specific registers (MSR) that may vary across processor models. The computing system can host a computing environment that includes a process/thread 202, a processor trace module 204, an exploit detector module 208, and a security response module 210. The various modules of the environment 200 may be embodied as hardware, firmware, software, or a combination thereof. For example, the various modules, logic, and other components of the environment 200 may form a portion of, or otherwise be established by, the processor 102 or other hardware components of the computing system 100. As such, in some embodiments, any one or more of the modules of the environment 200 may be embodied as a circuit or collection of electrical devices (e.g., a processor trace circuit, an exploit detector circuit, etc.).

The process/thread 202 may be embodied as any operating system process, thread, lightweight process, or other program executed by the computing system 100. The process/thread 202 executes a stream of instructions that may include control flow instruction such as call instructions, return instructions, and indirect branch instructions. The process/thread 202 may maintain a stack in the memory device 120 that is used to store return addresses, stack base pointers, function parameters, and other data. In some embodiments, each thread of a process may maintain a separate stack. The process/thread 202 may execute in user mode or otherwise execute with limited privileges.

The processor trace module 204 is configured to generate trace data indicative of control flow of the process/thread 202 executed by the computing system 100. The processor trace module 204 may include, invoke, or otherwise use the trace module 109 of the processor 102 to generate part or all of the trace data. In one embodiment the processor trace module 204 can include a processor trace driver or other software logic that enables the output of processor trace data. The trace data may be stored in a trace data area 206 in the memory device 120. The trace data area 206 may be marked as write-only or otherwise protected from unauthorized access or modification. In some embodiments, the trace data area 206 may be inaccessible to unprivileged software. The exploit detector module 208 is configured to analyze the trace data to identify a potential exploit. The exploit detector module 208 may be configured to analyze trace data using a heuristic algorithm to identify suspected programming exploits. The security response module 210 is configured to handle a suspected exploit. The security response module 210 may be configured to, for example, notify the user of the suspected exploit, terminate the process/thread 202, or perform any other appropriate security response.

The processor trace module 204 and the exploit detector module 208 can be configured to make use of the filtered processor trace data provided by embodiments described herein. In one embodiment, the trace module 109 can be configured via the configuration registers 201 to filter the types of trace packets that will be output. The configuration of the trace module 109 can be performed by the processor trace module 204 or the exploit detector module 208. In one embodiment, the security response module 210, in response to suspicious activity detected by the exploit detector module 208, can adjust the configuration registers 201 to tailor the configuration of the trace module 109 based on the detected suspicious activity.

In one embodiment, filtering can be enabled or disabled globally via an enable filtering bit (e.g., IA32_RTIT_CTL.EnFilter) in a packet trace control register within the configuration registers 201. The one or more configuration registers can additionally include a filter configuration register (e.g., IA32_RTIT_FILTER) which can be used to fine-tune the specific type of filtering to be performed. In various embodiments, filtering can be performed at the individual granularity of the individual types of trace packets or based on classes of types of trace packets. In the various embodiments, filtering can be enabled at the coarse-grained or fine-grained granularity. In one embodiment, coarse grained filtering can be performed using a filter control register structured as shown in Table 1.

TABLE 1

| RTIT Filter Control Register for Coarse Grained Filtering | | |
|---|---|---|
| Bit | Field | Description |
| 0 (= 0 to filter, 1 to capture) | TNT | Capture TNT packets |
| 1 | TIP | Capture TIP packets |
| 2 | FUP | Capture FUP packets |
| 3 | IND_BR_TYPE | Generate packets containing indirect branch type |
| 4-63 | Reserved | |

Table 1 illustrates a coarse filtering control register that enables capturing or filtering to be configured for TNT, TIP, and FUP. Additionally, IND_BR_TYPE packets can be output that contain the type of indirect branch that is taken. Alternatively, in one embodiment, the coarse filter control register of Table 1 can be excluded and the single bit to enable or disable filtering can disable or disable the capture of TNT packets. Disabling output of TNT packets can significantly reduce the processor trace overhead for security-oriented operations, as TIP packets are more useful in such scenarios.

In one embodiment, fine grained filtering can be implemented. When fine grained filtering is implemented, fine grained filter control register can be used, as shown in Table 2.

TABLE 2

| RTIT Control Register for Fine Grained Filtering | | |
|---|---|---|
| Bit | Field | Description |
| 0 (= 0 to filter, 1 to capture) | JCC | Trace conditional branches (TNT) |
| 1 | NEAR_IND_CALL | Trace near indirect calls (TIP) |
| 2 | NEAR_RET | Trace near returns (TIP) |
| 3 | NEAR_IND_JMP | Trace near indirect jumps |
| 4 | FAR_BRANCH | Trace far branches, interrupts, faults, INIT/SIPIs, RSMs |
| 5 | IND_BR_TYPE | Generate packets containing indirect branch type |
| 6-63 | Reserved | |

Where fine grained filtering is enabled, capture or filtering can be configured for TNT packets upon execution of conditional branches (JCC), TIP packets on execution of near indirect calls (NEAR_IND_CALL), or TIP packets on execution of near indirect jumps (NEAR_IND_JMP). Trace packets can also be configured for far branches (FAR_BRANCH) based on interrupts, faults, or execution of system management instructions (INIT/SIPIs, RSMs, etc.). In one embodiment, TIP packets may be used as trace packets for far branches. In one embodiment, FUP and/or TIP packets may be used for interrupts, faults, and system instructions or events. In one embodiment, additional trace packets can also be generated that indicate the type of indirect branch (IND_BR_TYPE) that is being executed.

Indirect Branch Information Packets

In addition to including an option to output trace packets that include the type of indirect branch, in one embodiment including the type of indirect branch (e.g., return, indirect call/jump, etc.) can also output an operand type (e.g. REG, MEM) in the trace. Including the type of indirect branch and the operand type in the trace enhances the ability of security analysis logic to detect potentially malicious code. For example, security analysis logic can implement robust control flow validation policies depending on the branch type and facilitate processor trace based security solutions to enable the detection of script-based malware, such as attacks performed using just-in-time (JIT) compiled code or shell-script based attacks (e.g., PowerShell, UNIX script, etc.). A BRI (branch information) trace packet can be output as shown in Table 3 below.

TABLE 3

Branch Information Trace Packet

| Bit | 7 | 6 | 5 | 4 | 3 | 2 | 1 | 0 |
|---|---|---|---|---|---|---|---|---|
| 0 | | Operand Type | | | | 1 | 1 | 0 |
| 1 | | | | Branch Type | | | | |

In one embodiment the BRI trace packet is a two-byte packet, although other sizes may be used in other embodiments. Output of the BRI trace packet can be enabled by capturing the IND_BR_TYPE packet when fine-grain filtering is enabled, as shown in Table 2 above. The operand type and branch type values are shown in Table 4 below.

TABLE 4

BRI Trace Packet Field Description

| BRI Packet | Value | Information Description |
|---|---|---|
| Byte 0, bits 0-2 | 110 | Packet Header |
| Byte 0, bits 3-7 | 00 | Register |
| Operand type | 01 | Memory |
| | 10 | Immediate |
| Byte 1, bits 0-7 | 00 | Near Indirect call |
| Branch type | 01 | Near Return |
| | 10 | Near Indirect Jump |
| | 11 | Far indirect call |
| | 100 | Far return |
| | 101 | Far indirect jump |
| | 110 | Asynchronous calls (interrupt, callback, exception) |
| | 111 | System call |
| | 1000 | Return from a system call |

Depending on the control bits set in the appropriate control registers, an indirect branch may result in the generation of a set of <FUP, TIP, BRI> trace packets.

In one embodiment, BRI packet byte 0, bits 0-2 include a packet header. Byte 0, bits 3-7 can be used to indicate an operand type for the indirect branch (e.g., register, memory, immediate). Byte 1, bits 0-7 can be used to indicate a branch type (e.g., near indirect call, near return, near indirect jump, far indirect call, far return, far indirect jump). The branch type can also include asynchronous calls, such as interrupts, callbacks and exceptions, as well as system calls and return from system calls. Other possible values are reserved for future usage.

Generate Source IP Corresponding to Target IP in TIP Packets

When using existing processor trace capability determining source IP data may require the decoding and analysis of full trace data. Additionally, examination of program binary data may be required. The ability to enable source IP data to be output along with target IP data enables context sensitive runtime security analysis and reduces the amount of state information to be maintained while control flow validation is performed. Embodiments described herein enable the coupling of source instruction pointer (IP) data with data on the target IP of a branch. Such coupling can facilitate accurate and high-performance real-time security monitoring of a program execution.

In one embodiment, a FUP packet can be generated that contains the source IP of the target IP contained in every TIP packet. To control the generation of <FUP, TIP> pairs, an additional control bit (e.g., FUPonTIP) can be enabled in a system control register. For example, reserved bit 18 in the IA32_RTIT_CTL MSR can be used for processors provided by the Intel Corporation of Santa Clara, Calif., although no specific register implementation is limiting as to all embodiments. Other embodiments enabled for implementation by other processor manufacturers may use other control schemes. When the additional control bit is set to a zero value, legacy behavior can be maintained and no additional FUPs packets are added, whereas a value of one enables the generation of FUP packets in conjunction with TIP packets. In one embodiment a FUP packet is output before each TIP packet when the FUPonTIP feature is enabled, although in other embodiments a FUP packet can be output after the TIP packet.

In one embodiment, return instruction (RET) compression can be enabled. When RET compression is enabled, the processor trace data may include a bit in a TNT packet in place of a TIP packet containing a return target address. In such scenario, the FUP packet will precede the TNT packet instead of a TIP that encodes a matched return. The FUP packet will then be matched with the youngest bit in the TNT packet (e.g., bit for RET) and the current TNT packet will be flushed on every RET instruction.

Filtered Processor Trace Data Generation

Processor trace packets generated by processor trace circuitry within the trace module 109 may be stored temporarily by the circuitry and then be provided to memory and/or other storage for analysis. The processor trace data may then be utilized for control flow analysis operations, e.g., to reconstruct the program flow. Control flow data can be combined with program binary data to reconstruct a control flow graph (CFG) that represents the exact sequence of instructions executed by a processor.

Figure 3:
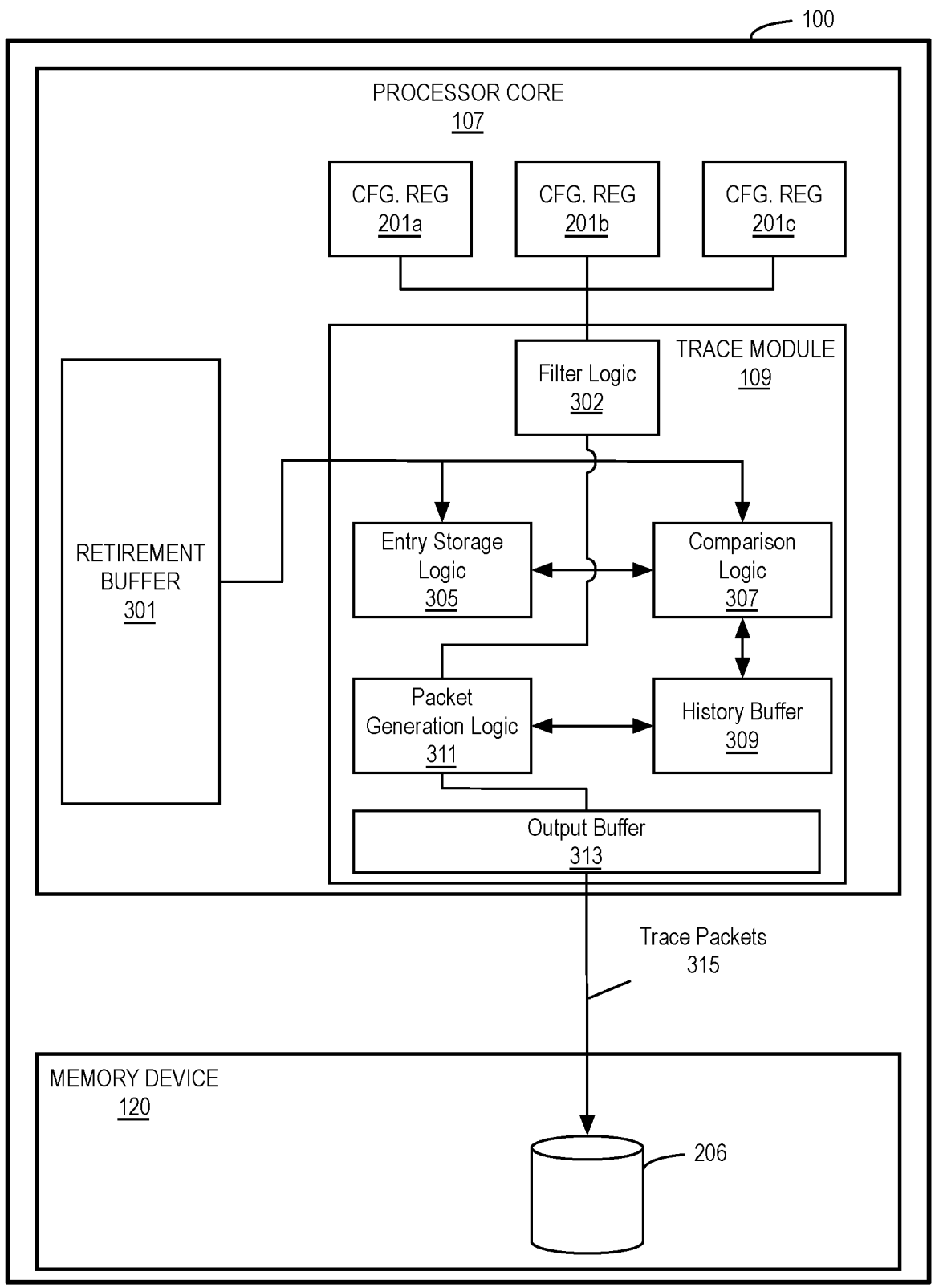
FIG. 3 illustrates logic to generate filtered processor trace data, according to an embodiment.

FIG. 3 illustrates logic to generate filtered processor trace data, according to an embodiment. In one embodiment a processor core 107 within the computing system 100 described herein can include a retirement buffer 301 that couples with the trace module 109. The retirement buffer 301 can temporarily store instructions that are retired by the processor core 107. The trace module 109 can read data on the retired instructions to determine the trace packets to be generated. In one embodiment the trace module 109 includes filter logic 302, an entry storage logic 305, comparison logic 307, a history buffer 309, packet generation logic 311, and an output buffer 313. The processor core 107 can also include a set of configuration registers 201a-201c that can be used to enable or disable various features of the filter logic 302. During operation, if an indirect branch instruction is retired to the retirement buffer 301, an entry can be made by the entry storage logic 305 to record data on the instruction. Comparison logic 307 can be used to analyze retired conditional branch instructions and bits can be set in the history buffer 309 for use in generating the data output within TNT packets. The packet generation logic 311 can use data stored by the entry storage logic and data within the history buffer 309 to generate processor track packets as described herein. The filter logic 302 can read configuration data from the configuration registers 201a-201c and configure the packet generation logic 311 to either output or filter selected trace packets 315. Trace packets 315 that are configured to be captured can be written to the output buffer 313 before being output to the trace data area 206 in the memory device 120.

The trace packets 315 can be used to enable control flow analysis operations. Control flow data can be combined with program binary data to reconstruct a control flow graph (CFG) that represents the exact sequence of instructions executed by a processor. In a CFG, each node in the graph corresponds to a basic block. A basic block is a sequence of instructions where control enters at the beginning of the sequence and control leaves at the end of the sequence, without branching in or out in the middle of the basic block. A destination (e.g., target) address may correspond to a start of a basic block and an indirect branch instruction may correspond to an end of the block. An address of the indirect branch instruction may correspond to a source address. A target address of the indirect branch instruction may correspond to a next possible address of a next basic block in the CFG. Edges between two basic blocks (e.g., a first block and a second block) represent control flow transfer from the end of the first block to the beginning of the second block. A node may thus include a start address of the basic block, an end address of the basic block and a next possible start address of a next basic block i.e., a beginning address of a next/reachable basic block.

Figure 4:
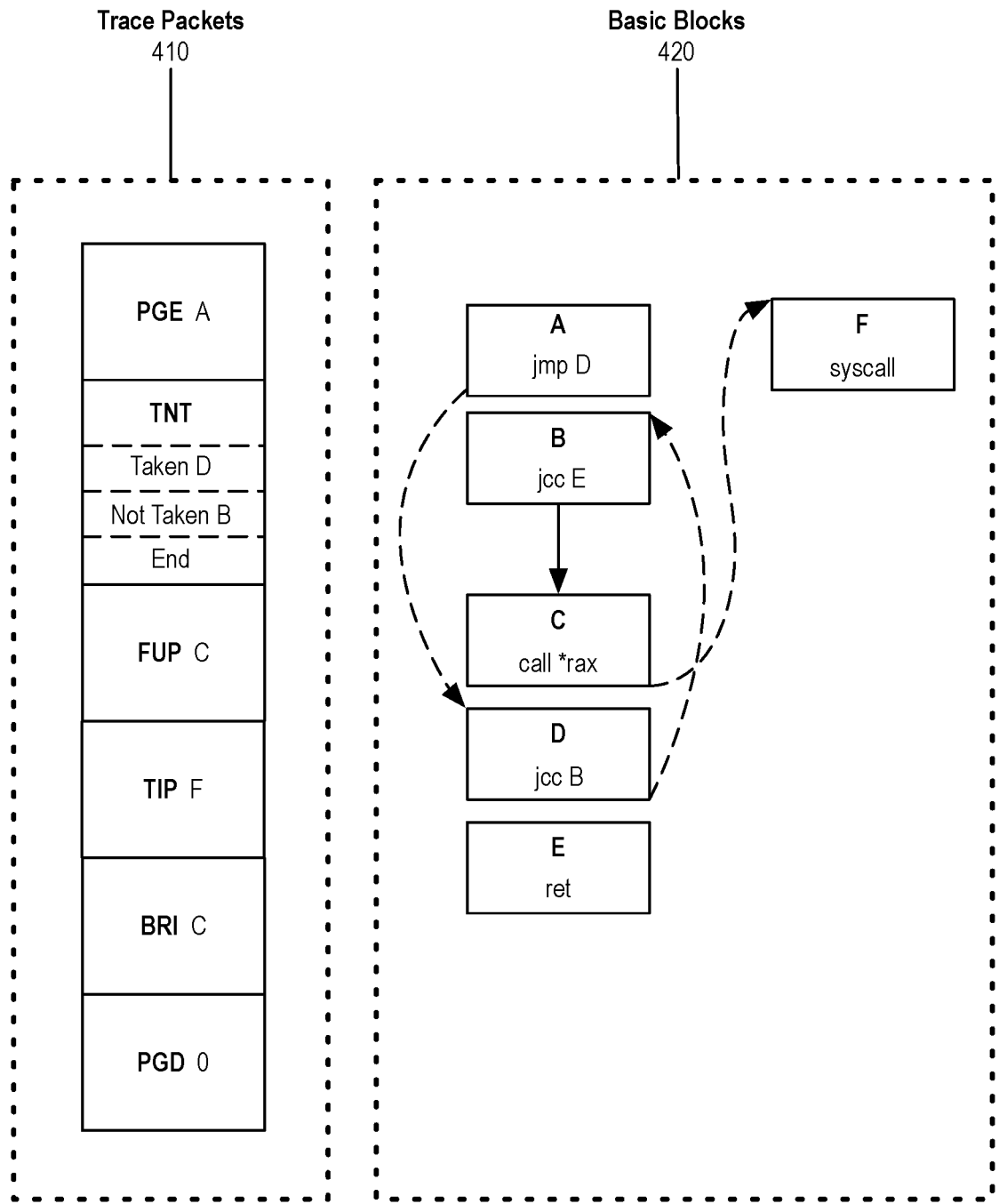
FIG. 4 illustrates a basic blocks and associated processor trace packets.

FIG. 4 illustrates a basic blocks and associated processor trace packets. A trace module 109 as described herein can output a set of trace packets 410 in response to execution of instructions represented by an illustrated set of basic blocks 420. The illustrated trace packets 410 include a packet generation enable packet (PGE A), taken or not taken packet (TNT), a flow update packet (FUP C), a target addresses of indirect branch instruction packet (TIP F), and a packet generation disable packet (PGD 0).

The packet generation enable packet (PGE A) indicates the instruction pointer at which tracing begins for the set of basic blocks 420, and is associated with basic block A, which includes a jump instruction to basic block D (jmp D). As the jump to basic block D is a direct branch, a trace packet may not be generated due to the deterministic nature of the direct branch. At basic block D, a conditional jump to block B (jcc B) is executed and a TNT packet (TNT) can be generated by the trace module 109 when the capture of TNT packets is enabled. The TNT packet includes taken or not taken bits that indicate whether a set of conditional branches was taken or not taken. A single TNT packet can include data for multiple conditional branches. For example, the TNT branch can indicate that the conditional branch at basic block D (jcc B) was taken (taken D), while the conditional branch at basic block B (jcc E) was not taken and control passes to basic block C (call *rax). When return compression is in use and a target of a return instruction can be determined from a previous matching call instruction, the return instruction can be compressed into a bit in the TNT packet. If filtering of TNT packets is enabled, the set of trace packets 410 will not include the TNT packet.

A basic block C, an indirect call (call *rax) to basic block F is executed. Depending on the capture or filter configuration, the trace module 109 may output a FUP packet (FUP C), a TIP packet (TIP F), and a BRI packet (BRI C) in response to the indirect call at basic block C. The FUP packet indicates the source instruction pointer for the indirect call at basic block C. The TIP packet indicates the target instruction pointer for the indirect call, and the BRI packet provides branch information on the indirect branch at basic block C, including the type of indirect branch and the type of operand used for the indirect branch, as shown in Table 3 and Table 4 above. If the conditional branch at basic block D (jcc B) were not taken, control may pass to basic block E. If the return at basic block E were to be executed and each of TNT packets are enabled, return compression is in use, and FUPonTIP is enabled, then a FUP packet for the return at basic block E may be issued before the TNT packet that includes the compressed return. The packet generation disable packet (PGD 0) at the end of the set of trace packets 410 indicates that the end of the set of trace packets 410 has been reached.

Figure 5:
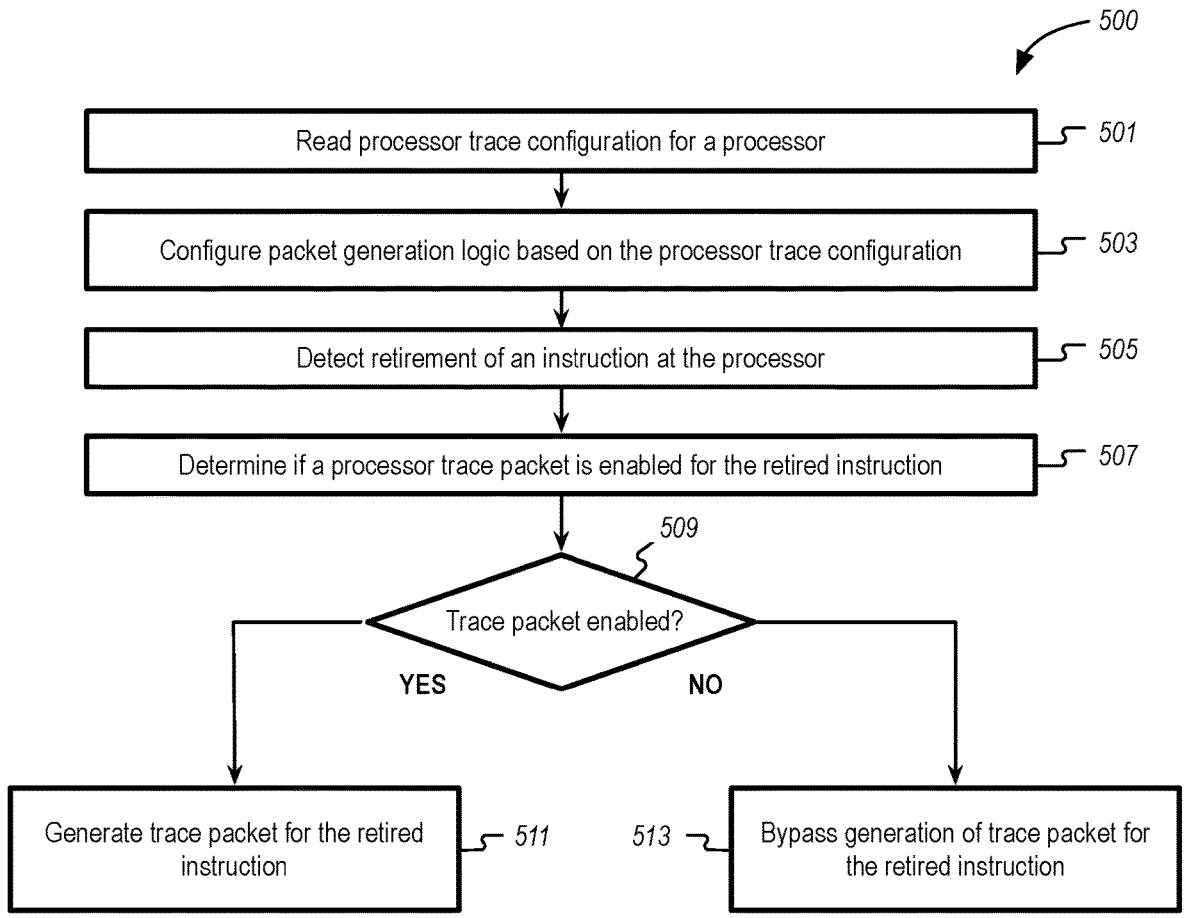
FIG. 5 illustrates a method of filtering or capturing processor trace packets, according to an embodiment.

FIG. 5 illustrates a method 500 of filtering or capturing processor trace packets, according to an embodiment. Method 500 can be performed by a trace module 109 described herein, which can be embodied as any hardware, microcode, firmware, or other components of a processor that are capable of generating trace data that may be used to reconstruct the control flow executed by the processor.

Method 500 includes for the trace module to read a processor trace configuration for a processor (block 501). The processor trace configuration can be read from one or more configuration registers for the processor. Method 500 further includes operations to configure packet generation logic of the processor trace module based on the processor trace configuration (block 503). Filter techniques can include filtering TNT packets from the processor trace data, filtering or capturing trace packets using coarse grained filtering, as shown in Table 1, or filtering or capturing using fine grained filtering, as shown in Table 2. During operation, the trace module for the processor can detect a retirement of an instruction at the processor (block 505). The trace module can detect the retirement of the instruction via a retirement buffer (e.g., retirement buffer 301 of FIG. 3). In one embodiment, the instruction is a non-deterministic control flow transfer instruction, such as an indirect branch, conditional branch, interrupt, call, return, or similar instruction. The trace module can then determine if a processor trace packet is enabled for the retired instruction (block 507). If a trace packet is enabled (YES, block 509), the trace module can generate a trace packet for the retired instruction (block 511). If the trace packet is not enabled (NO, block 509), the trace module can bypass trace packet generation for instruction (block 513). While processor trace packets may be output in response to retirement of an instruction in one embodiment, other embodiments may generate or output processor trace instructions in response to execution of the instruction or may be triggered by other stages of the instruction execution pipeline.

Figure 6A:
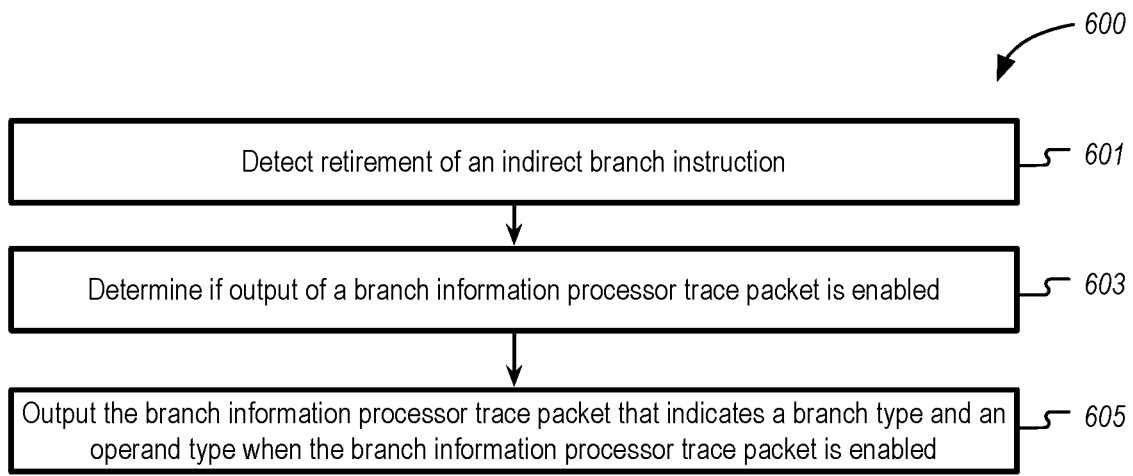
FIG. 6A-6B illustrate methods to output additional processor trace packets according to embodiments described herein.
Figure 6B:
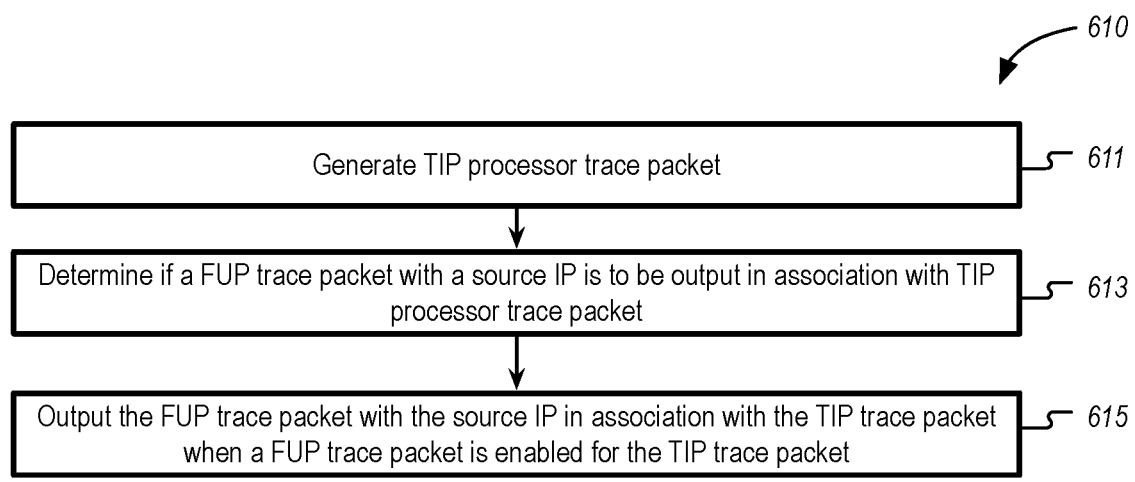

FIG. 6A-6B illustrate methods to output additional processor trace packets according to embodiments described herein. FIG. 6A illustrates a method 600 to determine whether to capture branch information for retired indirect branches and output the branch information as a branch information processor trace packet. FIG. 6B illustrates a method 610 to determine whether to capture source instruction pointer data for indirect branches and output this information within a flow update processor trace packet. Method 600 and method 610 can be performed by a trace module 109 described herein, which can be embodied as any hardware, microcode, firmware, or other components of a processor that are capable of generating trace data that may be used to reconstruct the control flow executed by the processor.

As shown in FIG. 6A, method 600 includes an operation to detect retirement of an indirect branch instruction (block 601). Method 600 additionally includes to determine if output of a branch information processor trace packet is enabled (block 603) and output a branch information processor trace packet that indicates a branch type and an operand type when the branch information processor trace packet is enabled (block 605). In one embodiment, the branch information processor trace packet is structured as shown in Table 3 and Table 4 above.

As shown in FIG. 6B, method 610 includes an operation to generate TIP processor trace packet (block 611). TIP processor trace packets are generated to indicate that control flow was transferred to the instruction pointer provided in the packet payload. TIP packets can be generated in response to indirect branches, exceptions, interrupts, and other branches or events. Method 610 can then perform an operation to determine if a FUP trace packet with source IP is to be output in association with a TIP processor trace packet (block 613). Method 610 then performs an operation to output the FUP trace packet with the source IP in association with the TIP trace packet when FUP trace packet is enabled for the TIP trace packet (block 615).

Additional Exemplary Computing Devices

Figure 7:
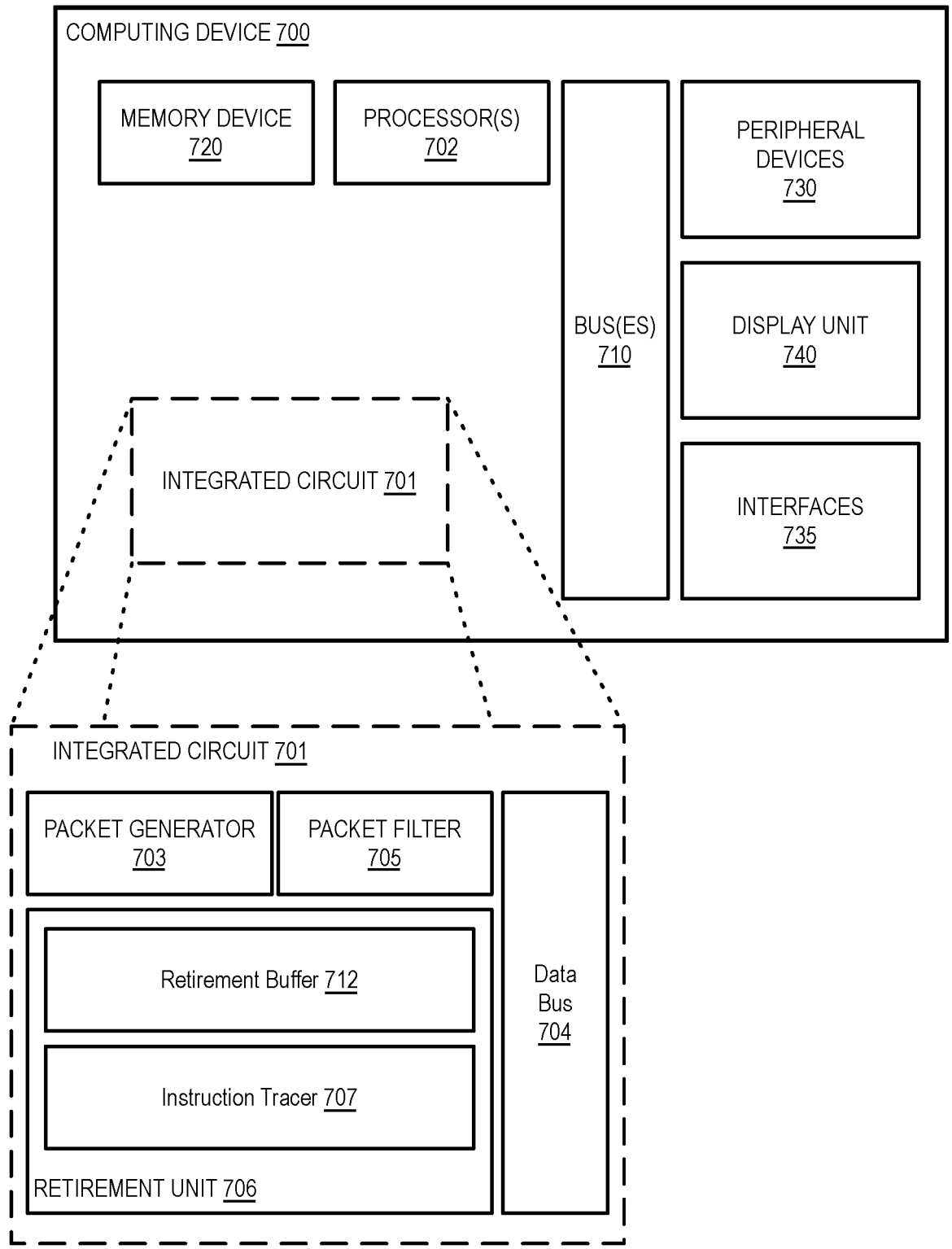
FIG. 7 illustrates a computing device in accordance with which embodiments described herein may operate, be installed, integrated, or configured.

FIG. 7 illustrates a computing device 700 in accordance with which embodiments described herein may operate, be installed, integrated, or configured. The integrated circuit 701 may operate as, for example, a processor or as another computing component of computing device 700. In one embodiment the computing device 700 includes a memory device 720 and a processor or processors 702. For example, the memory device 720 may store instructions to be executed by the processor(s) 702. The computing device 700 includes communication bus(es) 710 to transfer transactions, instructions, requests, and data within computing device 700 among a plurality of peripheral device(s) 730 communicably interfaced with one or more communication buses 710 and/or interface(s) 735. A display unit 740 can be included within or coupled to the computing device 700. The display unit 740 may be a touchscreen interface. In one embodiment the computing device 700 is a tablet or the smartphone device and the display unit 740 is a touchscreen interface of the tablet or smartphone device. The computing device 700 may also be, for example, a smart appliance device or another embedded device, such as within Internet-of-things (IoT) device with wired or wireless connectivity to a local or wide area network.

The computing device 700 includes integrated circuit 701 which may be installed and configured in a compatible computing device 700, or manufactured and provided separately so as to operate in conjunction with appropriate components of computing device 700. The integrated circuit 701 of computing device 700 includes at least: a data bus 704, packet generator circuit 703, packet filter 705 circuit, and a retirement unit 706.

The retirement unit 706 is configured to retire instructions (or microoperations associated with instructions) for which execution has completed by writing the results of the completed instructions to user-visible registers. The retirement unit 706 includes a retirement buffer 712 to store data with respect to retired instruction. In one embodiment the retirement unit 706 includes an instruction tracer 707, which can performs operations associated with the trace module 109 as described herein. For example, the instruction tracer 707 can trace or track the instructions executed by the processor or processors 702 by tracking instruction retirement data that is written to the retirement buffer 712.

In one embodiment the packet generator circuit 703 can perform operations of the packet generation logic 311 in the trace module 109, as shown in FIG. 3. The packet generator circuit 703 can work in concert with the instruction tracer 707 of the retirement unit 706 to generate a processor trace packets that describe the traced instructions. The packet filter circuit 705 can configure the type of processor trace packets that will be output by the packet generator 703. In addition to enabling or disabling the generation of processor trace packets for all instructions or a select set of instructions, the packet filter circuit 705 can configure the packet generator circuit 703 to selectively enable or disable the output of processor trace packets on a per-packet basis.

Figure 8A:
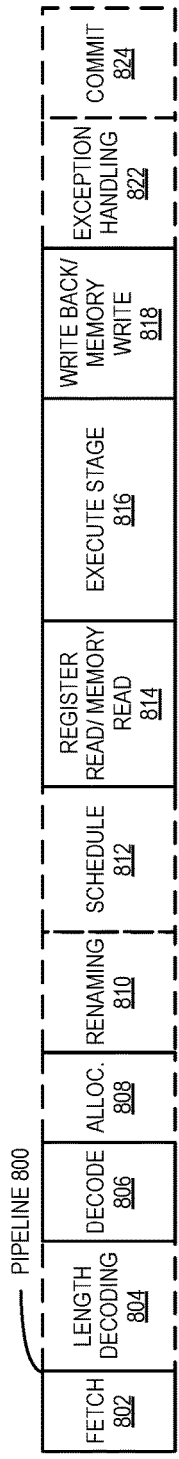
FIG. 8A-8B illustrate elements of a processor microarchitecture according embodiments described herein.
Figure 8B:
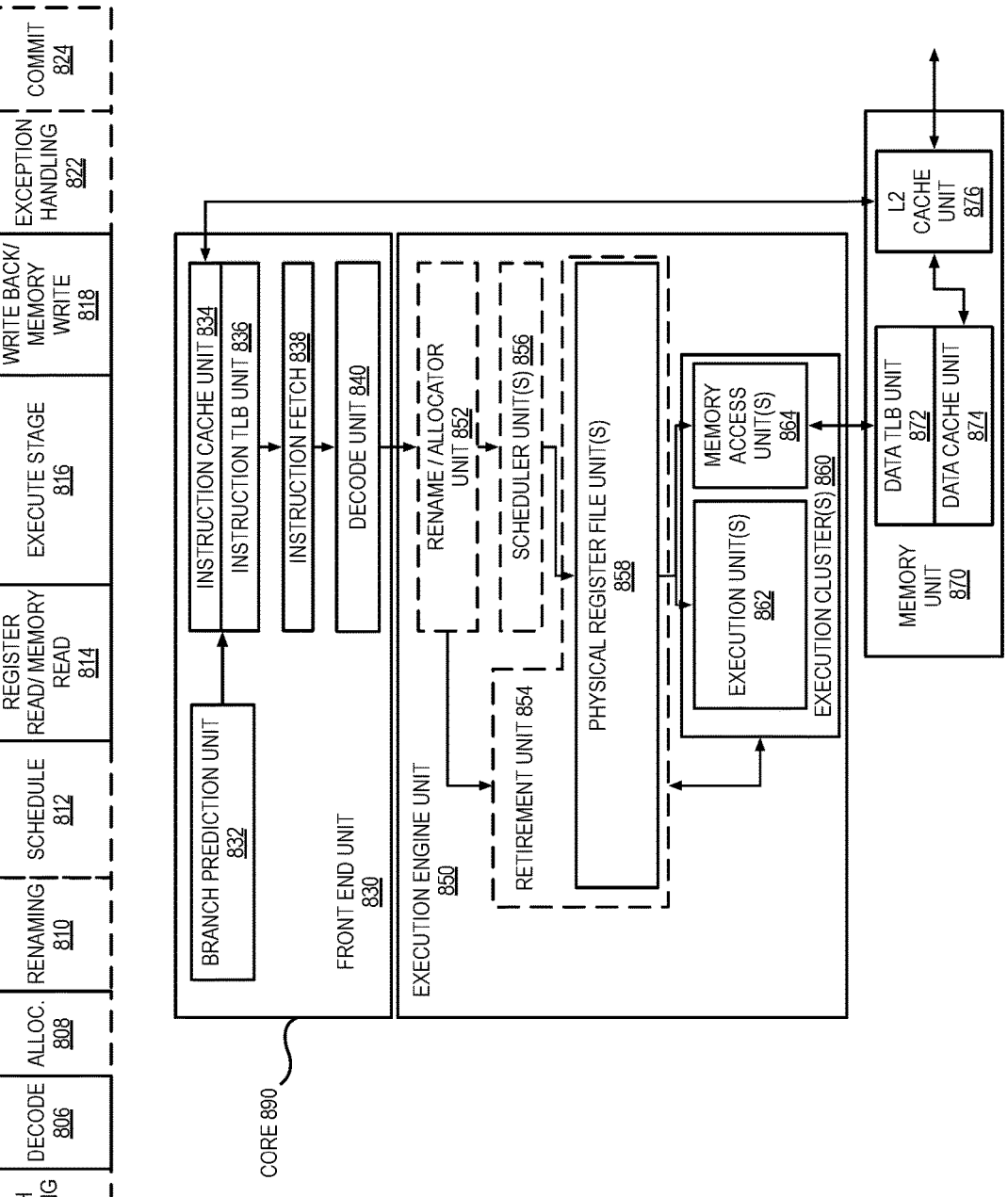

FIG. 8A is a block diagram illustrating an in-order pipeline and a register renaming stage, out-of-order issue/execution pipeline according to at least one embodiment. FIG. 8B is a block diagram illustrating an in-order architecture core and a register renaming logic, out-of-order issue/execution logic to be included in a processor according to at least one embodiment. The solid lined boxes in FIG. 8A illustrate the in-order pipeline, while the dashed lined boxes illustrates the register renaming, out-of-order issue/execution pipeline. Similarly, the solid lined boxes in FIG. 8B illustrate the in-order architecture logic, while the dashed lined boxes illustrates the register renaming logic and out-of-order issue/execution logic.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

In FIG. 8B, arrows denote a coupling between two or more units and the direction of the arrow indicates a direction of data flow between those units. FIG. 8B shows processor core 890 including a front end unit 830 coupled to an execution engine unit 850, and both are coupled to a memory unit 870.

The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit or decoder may decode instructions, and generate as an output one or more microoperations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 834 is further coupled to a level 2 (L2) cache unit 876 in the memory unit 870. The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc.

The physical register file(s) unit(s) 858 is overlapped by the retirement unit 854 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 8) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (including extensions and variants thereof); the MIPS instruction set of MIPS Technologies of Sunnyvale, Calif.; the ARM instruction set (with optional additional extensions such as NEON) of ARM Holdings of Cambridge, England, United Kingdom).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-threading (HT) technology).

While register renaming is described in the context of out-of-order execution, it should be understood that register renaming may be used in an in-order architecture. While the illustrated embodiment of the processor also includes a separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

As described herein, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One embodiment provides for a computing device including a hardware processor having a processor trace module to generate trace data indicative of an order of instructions executed by the hardware processor, where the processor trace module is configurable to selectively output a processor trace packet associated with execution of a selected non-deterministic control flow transfer instruction. Other embodiments of this aspect include corresponding computer systems, apparatus, and computer programs recorded on one or more computer storage devices, each configured to perform the actions of the methods.

In one embodiment, to selectively output a processor trace packet includes to: read a processor trace configuration for the hardware processor; detect execution of an instruction at the hardware processor, where the instruction is a non-deterministic control flow transfer instruction; determine if a processor trace packet is enabled for the instruction; and in response to a determination that the processor trace packet is enabled for the instruction, generate a processor trace packet for the instruction. In one embodiment, to selectively output a processor trace packet includes to: in response to a determination that the processor trace packet is not enabled for the instruction, bypass generation of the processor trace packet for the instruction. In one embodiment, execution of the selected non-deterministic control flow transfer instruction at the hardware processor is detected upon retirement of the instruction. In one embodiment, to read the processor trace configuration for the hardware processor includes to read a configuration register associated with the hardware processor.

In one embodiment the configuration register associated with the hardware processor is a first configuration register and to read the processor trace configuration for the hardware processor includes to: read a first bit in the first configuration register to determine whether output of processor trace packets is enabled for the hardware processor; and read a second bit in a second configuration register to determine whether output of a processor trace packet is enabled for the instruction. In one embodiment the processor trace module includes a packet generator to generate the processor trace packet for the instruction and to selectively output a processor trace packet includes to: configure the packet generator to generate the processor trace packet for the instruction based on the second bit in the second configuration register. In one embodiment to selectively output a processor trace packet includes to: determine that the selected non-deterministic control flow transfer instruction is an indirect branch instruction; read a processor trace configuration for the hardware processor; and based on the processor trace configuration for the hardware processor, determine if a branch information processor trace packet is enabled for the hardware processor; output the branch information processor trace packet for the indirect branch instruction, where the branch information processor trace packet includes a branch type and an operand type for the indirect branch instruction. In one embodiment the branch type is selected from a set of branch types, the set of branch types including a near indirect call, a near indirect jump, a far indirect call, a far return, a far indirect jump, an asynchronous call, a system call, and a return from a system call. In one embodiment the operand type is selected from a set of operand types, the set of operand types including a register, memory, or immediate.

In one embodiment to selectively output a processor trace packet includes to: determine that a first processor trace packet is to be generated for the selected non-deterministic control flow transfer instruction, where the first processor trace packet is to indicate that control flow was transferred to a target instruction pointer; read a processor trace configuration for the hardware processor to determine whether to output a second processor trace packet for the selected non-deterministic control flow transfer instruction; and based on the processor trace configuration for the hardware processor, output the second processor trace packet for the selected non-deterministic control flow transfer instruction, where the second processor trace packet is to indicate that control flow was transferred to the target instruction pointer from a source instruction pointer. Implementations of the described techniques may include hardware, a method or process, or computer software on a computer-accessible medium.

One embodiment provides for a computing system including: a memory device and a hardware processor coupled to the memory device, where the hardware processor includes a processor trace module configured to generate trace data indicative of an order of instructions executed by the hardware processor. The processor trace module is configurable to selectively output a processor trace packet associated with execution of a selected non-deterministic control flow transfer instruction and the processor trace packet is output to the memory device. Other embodiments of this aspect include corresponding computer systems, apparatus, and computer programs recorded on one or more computer storage devices.

In one embodiment, execution of the selected non-deterministic control flow transfer instruction at the hardware processor is detected upon retirement of the instruction. In one embodiment the processor trace module is to selectively output the processor trace packet based on a type of processor trace packet to be output. In one embodiment the type of processor trace packet to be output is selected from a set of processor trace packets including: a first processor trace packet to indicate whether a conditional branch is taken. The computing system may also include a second processor trace packet to indicate a target address of an indirect branch. The computing system may also include instruction; and a third processor trace packet to indicate a source address for an asynchronous event. In one embodiment the set of processor trace packets additionally includes: a fourth processor trace packet to indicate a branch type and an operand type for an indirect branch instruction and the second processor trace packet can additionally indicate a source address for an indirect branch instruction. In one embodiment the processor trace module is to selectively output a processor trace packet based on a type of the selected non-deterministic control flow transfer instruction. In one embodiment the type of the selected non-deterministic control flow transfer instruction is selected from a set of control flow transfer instructions including a conditional branch, a near indirect call, a near return, a near indirect jump, and a far branch.

One embodiment provides for a method performed on a processor device, the method including: reading a processor trace configuration for the processor device, where reading the processor trace configuration for the processor device includes reading a first bit in a first configuration register to determine whether output of processor trace packets is enabled for the processor device and reading a second bit in a second configuration register to determine whether a processor trace packet is to be output for an instruction; detecting retirement of an instruction on the processor device, where the instruction is a retired instruction in a set of non-deterministic control flow transfer instructions. The method additionally includes, in response to a determination that the processor trace packet is enabled for the retired instruction, generating the processor trace packet for the retired instruction and outputting the processor trace packet to memory coupled with the processor device. In one embodiment the set of non-deterministic control flow transfer instructions include: a first processor trace packet to indicate whether a conditional branch is taken, a second processor trace packet to indicate a target address of an indirect branch, a third processor trace packet to indicate a source address for an asynchronous event or an indirect branch instruction, and a fourth processor trace packet to indicate a branch type and operand type for an indirect branch. Implementations of the described techniques may include hardware to perform the described method and/or instructions stored to a computer-accessible medium that, when executed by one or more processors, perform the described method.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A computing device comprising:
a hardware processor comprising a processor trace module to:
read a processor trace configuration by reading a first bit in a first configuration register to determine whether output of processor trace packets is enabled for the processor device and reading a second bit in a second configuration register to determine whether a processor trace packet is to be output for an instruction;
detect retirement of an instruction on the hardware processor, wherein the instruction is a retired instruction in a set of non-deterministic control flow transfer instructions;
in response to a determination that the processor trace packet is enabled for the retired instruction based on the first bit, generate the processor trace packet for the retired instruction; and selectively output, based on the second bit, the processor trace packet associated with execution of a selected non-deterministic control flow transfer instruction.

2. The computing device as in claim 1, wherein the processor trace module is further to:

in response to a determination that the processor trace packet is not enabled for the instruction, bypass generation of the processor trace packet for the instruction.

3. The computing device as in claim 1, wherein execution of the selected non-deterministic control flow transfer instruction at the hardware processor is detected upon retirement of the instruction.

4. The computing device as in claim 1, wherein to read the processor trace configuration for the hardware processor includes to read a configuration register associated with the hardware processor.

5. The computing device as in claim 4, wherein the configuration register associated with the hardware processor is a first configuration register.

6. The computing device as in claim 5, wherein the processor trace module includes a packet generator to generate the processor trace packet for the instruction and to selectively output a processor trace packet includes to:

configure the packet generator to generate the processor trace packet for the instruction based on the second bit in the second configuration register.

7. The computing device as in claim 1, wherein to selectively output the processor trace packet includes to:

determine that the selected non-deterministic control flow transfer instruction is an indirect branch instruction;

read a processor trace configuration for the hardware processor; and based on the processor trace configuration for the hardware processor, determine if a branch information processor trace packet is enabled for the hardware processor;

output the branch information processor trace packet for the indirect branch instruction, wherein the branch information processor trace packet includes a branch type and an operand type for the indirect branch instruction.

8. The computing device as in claim 7, wherein the branch type is selected from a set of branch types, the set of branch types including a near indirect call, a near indirect jump, a far indirect call, a far return, a far indirect jump, an asynchronous call, a system call, and a return from a system call.

9. The computing device as in claim 7, wherein the operand type is selected from a set of operand types, the set of operand types including a register, memory, or immediate.

10. The computing device as in claim 1, wherein to selectively output the processor trace packet includes to:

determine that a first processor trace packet is to be generated for the selected non-deterministic control flow transfer instruction, wherein the first processor trace packet is to indicate that control flow was transferred to a target instruction pointer;

read a processor trace configuration for the hardware processor to determine whether to output a second processor trace packet for the selected non-deterministic control flow transfer instruction; and based on the processor trace configuration for the hardware processor, output the second processor trace packet for the selected non-deterministic control flow transfer instruction, wherein the second processor trace packet is to indicate that control flow was transferred to the target instruction pointer from a source instruction pointer.

11. A computing system comprising:

a memory device;

a hardware processor coupled to the memory device, the hardware processor including comprising a processor trace module to:

read a processor trace configuration by reading a first bit in a first configuration register to determine whether output of processor trace packets is enabled for the processor device and reading a second bit in a second configuration register to determine whether a processor trace packet is to be output for an instruction;

detect retirement of an instruction on the hardware processor, wherein the instruction is a retired instruction in a set of non-deterministic control flow transfer instructions;

in response to a determination that the processor trace packet is enabled for the retired instruction based on the first bit, generate the processor trace packet for the retired instruction; and selectively output, based on the second bit, the processor trace packet associated with execution of a selected non-deterministic control flow transfer instruction.

12. The computing system as in claim 11, wherein execution of the selected non-deterministic control flow transfer instruction at the hardware processor is detected upon retirement.

13. The computing system as in claim 11, wherein the processor trace module is to selectively output the processor trace packet based on a type of processor trace packet to be output.

14. The computing system as in claim 13, wherein the type of processor trace packet to be output is selected from a set of processor trace packets including:

a first processor trace packet to indicate whether a conditional branch is taken;

a second processor trace packet to indicate a target address of an indirect branch instruction; and a third processor trace packet to indicate a source address for an asynchronous event.

15. The computing system as in claim 14, wherein the set of processor trace packets additionally includes:

a fourth processor trace packet to indicate a branch type and operand type for an indirect branch instruction; and wherein the second processor trace packet is to indicate a source address for an indirect branch instruction.

16. The computing system as in claim 11, wherein the processor trace module is to selectively output a processor trace packet based on a type of the selected non-deterministic control flow transfer instruction.

17. The computing system as in claim 16, wherein the type of the selected non-deterministic control flow transfer instruction is selected from a set of control flow transfer instructions including a conditional branch, a near indirect call, a near return, a near indirect jump, and a far branch.

18. A method performed on a processor device, the method comprising:

reading a processor trace configuration for the processor device, wherein reading the processor trace configuration for the processor device includes reading a first bit in a first configuration register to determine whether output of processor trace packets is enabled for the processor device and reading a second bit in a second configuration register to determine whether a processor trace packet is to be output for an instruction;

detecting retirement of an instruction on the processor device, wherein the instruction is a retired instruction in a set of non-deterministic control flow transfer instructions;

in response to a determination that the processor trace packet is enabled for the retired instruction, generating the processor trace packet for the retired instruction; and outputting the processor trace packet to memory coupled with the processor device.

19. The method as in claim 18, wherein the set of non-deterministic control flow transfer instructions include:
- a first processor trace packet to indicate whether a conditional branch is taken;
- a second processor trace packet to indicate a target address of an indirect branch instruction;
- a third processor trace packet to indicate a source address for an asynchronous event or an indirect branch instruction; and
- a fourth processor trace packet to indicate a branch type and operand type for an indirect branch instruction.

\* \* \* \* \*